Nov. 28, 1933.    B. VOGLER    1,937,210
POWDER DISTRIBUTOR
Filed Nov. 11, 1931

Inventor:
Bruno Vogler.

Patented Nov. 28, 1933

1,937,210

UNITED STATES PATENT OFFICE 1,937,210

POWDER DISTRIBUTOR

Bruno Vogler, Berlin-Rummelsburg, Germany

Application November 11, 1931
Serial No. 574,410

2 Claims. (Cl. 221—114)

This invention relates to a powder distributor, particularly for the delivery of measured quantities of granulated sugar, and the invention consists in the provision of a vessel having at the bottom a funnel-shaped outlet and fitted with a vertical, spring-supported plunger carrying two valve elements arranged at opposite sides of the outlet and adapted to close the latter alternately on the plunger being depressed and released.

This device has the advantage that, while the sugar is carefully protected from dust and insects, it can be discharged without trouble and without waste.

Figure 1:
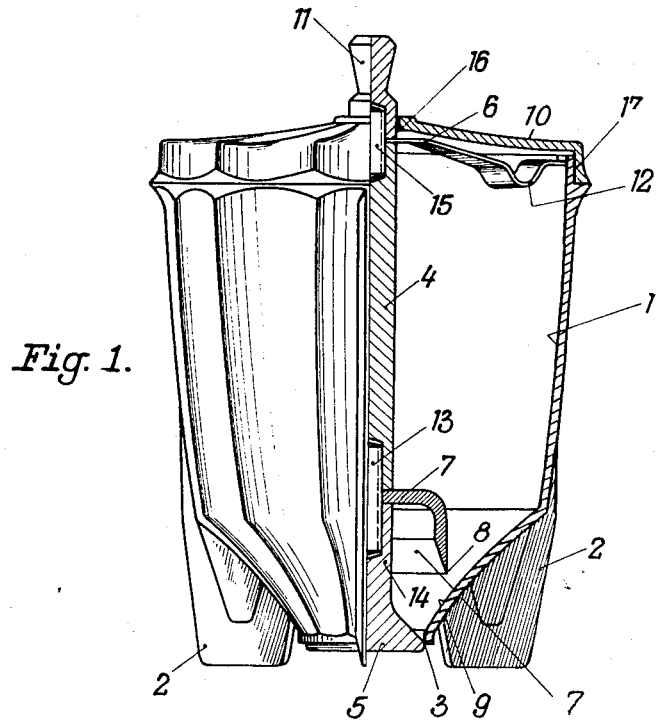
Figure 2:
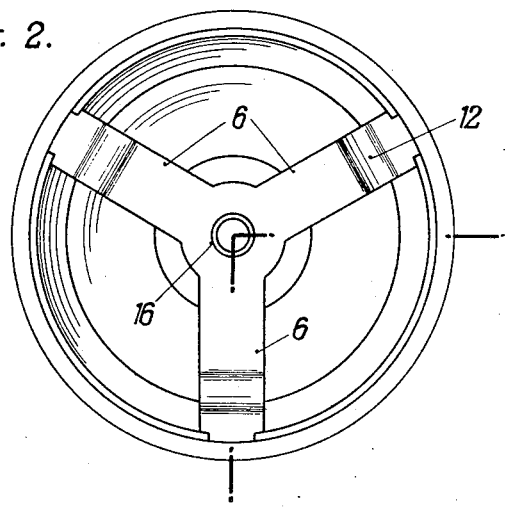

Fig. 1 of the accompanying drawing represents a view of a device according to the invention, partly in section and partly in elevation, and Fig. 2 is a plan-view of the vessel without cover.

The device comprises a vessel 1 which preferably tapers downwards and which in any case is formed with a funnel-shaped bottom portion 9 adapted to lead the contents towards an outlet 3. The vessel is closed by a cover 10 which preferably engages a conical rim 17 from the vessel but which may be connected to the latter by means of a screw thread or a bayonet joint for easy removal. A plunger 4 passes vertically through the vessel and is guided in an aperture in the cover 10. This plunger carries a valve cone 5 situated below the outlet 3 and also an inverted valve cup 7 situated above the outlet. The wall of the cup 7 is bevelled to form a sharp edge 8. A three-armed blade spring 6 is supported on the edge of the vessel between the latter and the cover and holds the plunger in its centre. Normally the cone 5 is maintained by the spring 6 against the outlet 3 and closes the latter. The cup 7 is normally spaced from the outlet and allows a given quantity of sugar to accumulate under the cup around the valve stem. On the plunger 4 being depressed by means of a knob 11, the cone 5 is opened and the edge 8 of the cup 7 is applied to the funnel 9. The sugar accumulated under the cup 7 will then be delivered while the remaining contents of the vessel are retained by the cup. When the plunger is released, the cone 5 is again closed, and a fresh charge of sugar is fed into delivery position. The quantity thus delivered at each depression of the plunger may be as small as half a teaspoonful.

The spring 6 is slightly domed, and the portion surrounding the plunger is brought nearly to the dead centre position when the plunger is depressed. It will thus be easy to maintain the plunger in the depressed position. The arms of the spring may be formed with U-shaped bends 12 adapted to facilitate its deflection.

The valve cone 5 is formed with a hollow valve stem 14 which is threaded for the reception of a screw bolt 13. The plunger 4 is hollowed and threaded in the same manner for connection to the bolt 15. The valve cup 7 is clamped between the stem 14 and the plunger. The knob 11 is connected to the plunger in the same manner through the medium of a screw bolt 15, and the spring 6 is clamped between the plunger and the knob.

The vessel, which my be provided with three supporting feet 2, is preferably pressed into shape from insulating material, for instance artificial resin which may be mixed to form a marble effect. The cover and valves are made from the same material. The shape and ornamentation of the vessel may be chosen according to requirements. In the example shown, the vessel is of dodecagonal cross-section.

I claim:

1. A powder distributor comprising a vessel having at the bottom a funnel-shaped outlet, a cover for said vessel, a plunger passing vertically through the vessel and guided in an aperture in said cover, a valve cone on said plunger situated under the outlet, an inverted valve cup on said plunger situated above the outlet and formed with a bevelled edge for application to the funnel wall, and a spring acting on the plunger and holding the valve cone normally against the outlet with the cup slightly spaced therefrom.

2. A powder distributor comprising a vessel having at the bottom a funnel-shaped outlet, a cover for said vessel, a plunger passing vertically through the vessel and guided in an aperture in said cover, a domed, three-armed blade spring connected at the centre to the plunger and resting with its arms on the vessel, the arms of said spring being formed with U-shaped bends allowing the arms to contract and reexpand a valve cone connected to the plunger below the outlet, and an inverted valve cup connected to the plunger above the outlet and formed with a bevelled edge for application to the funnel wall, said spring adapted to hold the cone normally against the outlet with the cup in position to close the outlet on the plunger being depressed.

BRUNO VOGLER.